United States Patent
Raab

[11] Patent Number: 5,978,748
[45] Date of Patent: Nov. 2, 1999

[54] HOST INDEPENDENT ARTICULATED ARM

[75] Inventor: Simon Raab, Longwood, Fla.

[73] Assignee: Faro Technologies, Inc., Lake Mary, Fla.

[21] Appl. No.: 09/111,411

[22] Filed: Jul. 7, 1998

[51] Int. Cl.⁶ .................................................. G05B 19/401
[52] U.S. Cl. .................... 702/150; 364/188; 364/478.01; 364/474.24; 33/503
[58] Field of Search ............................ 33/503, 504, 502; 73/1, 1.79; 364/167.01, 188–194, 478.01, 479.13, 474.24; 702/150

[56] References Cited

U.S. PATENT DOCUMENTS

| | | | |
|---|---|---|---|
| 5,412,880 | 5/1995 | Raab | 33/503 |
| 5,510,977 | 4/1996 | Raab | 364/167.01 |
| 5,550,953 | 8/1996 | Seraji | 395/98 |
| 5,611,147 | 3/1997 | Raab | 33/503 |
| 5,647,136 | 7/1997 | Jostlein | 33/502 |
| 5,794,356 | 8/1998 | Raab | 33/503 |

*Primary Examiner*—Kamini Shah
*Attorney, Agent, or Firm*—Cantor Colburn LLP

[57] ABSTRACT

An articulated arm including an on-board controller which stores one or more executable programs which provide the user with instructions (e.g. an inspection procedure) and stores the CAD data that serves as the reference data. The actual measurements can be compared to the reference data and the user can be notified of an actual measurement that is out of tolerance immediately.

24 Claims, 3 Drawing Sheets

HOST INDEPENDENT ARTICULATED ARM

BACKGROUND OF THE INVENTION

1. Field of the Invention

The invention relates in general to articulated arms for use in coordinate measurement machines (CMMs) and in particular to an articulated arm having an on-board processor and display for operation independent of a host computer.

2. Prior Art

FIG. 1 is a diagrammatic view of a conventional three dimensional measuring system generally including a coordinate measuring machine (CMM) 10 composed of a manually operated multijointed arm 12 and a support base or post 14, a controller or serial box 16 and a host computer 18. It will be appreciated that arm 12 electronically communicates with serial box 16 which, in turn, electronically communicates with host computer 18. Additional detail of the conventional three dimensional measuring system can be found in U.S. Pat. No. 5,402,582, the contents of which are incorporated herein by reference.

Currently, articulated arms are provided as a system with a host computer and applications software. The articulated arm is commonly used to measure points on an object and these measured points are compared to computer-aided design (CAD) data stored on the host computer to determine if the object is within the CAD specifications. In other words, the CAD data is the reference data to which actual measurements made by the articulated arm are compared. The host computer also contains applications software that guides the operator through the inspection process. In many occasions for complicated applications this arrangement is appropriate since the user will observe the three-dimensional CAD data on the host computer while responding to complex instructions and using complex commands in the applications software.

Current applications software also allows the user to write specific programs or executables in a learn mode which is then used by a far less trained individual in an execution mode to perform a pre-prescribed set of measurements of an object. The result is that the final usage of the articulated arm is highly simplistic in that an assembler or mechanic is instructed by the software prompts to position the probe at known locations and acquire the three-dimensional data. In this case, during the execution phase, the use of the high level host computer and application software is completely inappropriate and adds unnecessary costs.

Another drawback to conventional systems is that the measured data is not compared to the reference data (e.g. CAD data) in real time. Because the arm 12 has no processing capability, the measured or actual data must be transferred to the host computer 18 where it is compared to the reference (e.g. CAD) data to determine if the object meets the reference specifications. If the result of the comparison is not favorable, then the operator must be notified and the object may need additional measurement. This communication back and forth between the arm and the host creates unnecessary delay.

SUMMARY OF THE INVENTION

The above-discussed and other drawbacks and deficiencies of the prior art are overcome or alleviated by the host independent articulated arm of the present invention. The articulated arm includes an on-board controller which stores one or more executable programs which provides the user with instructions (e.g. inspection procedures) and stores the CAD data that serves as the reference data. The actual measurements can be compared to the reference data and the user can be notified of an actual measurement that is out of tolerance immediately.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 1:
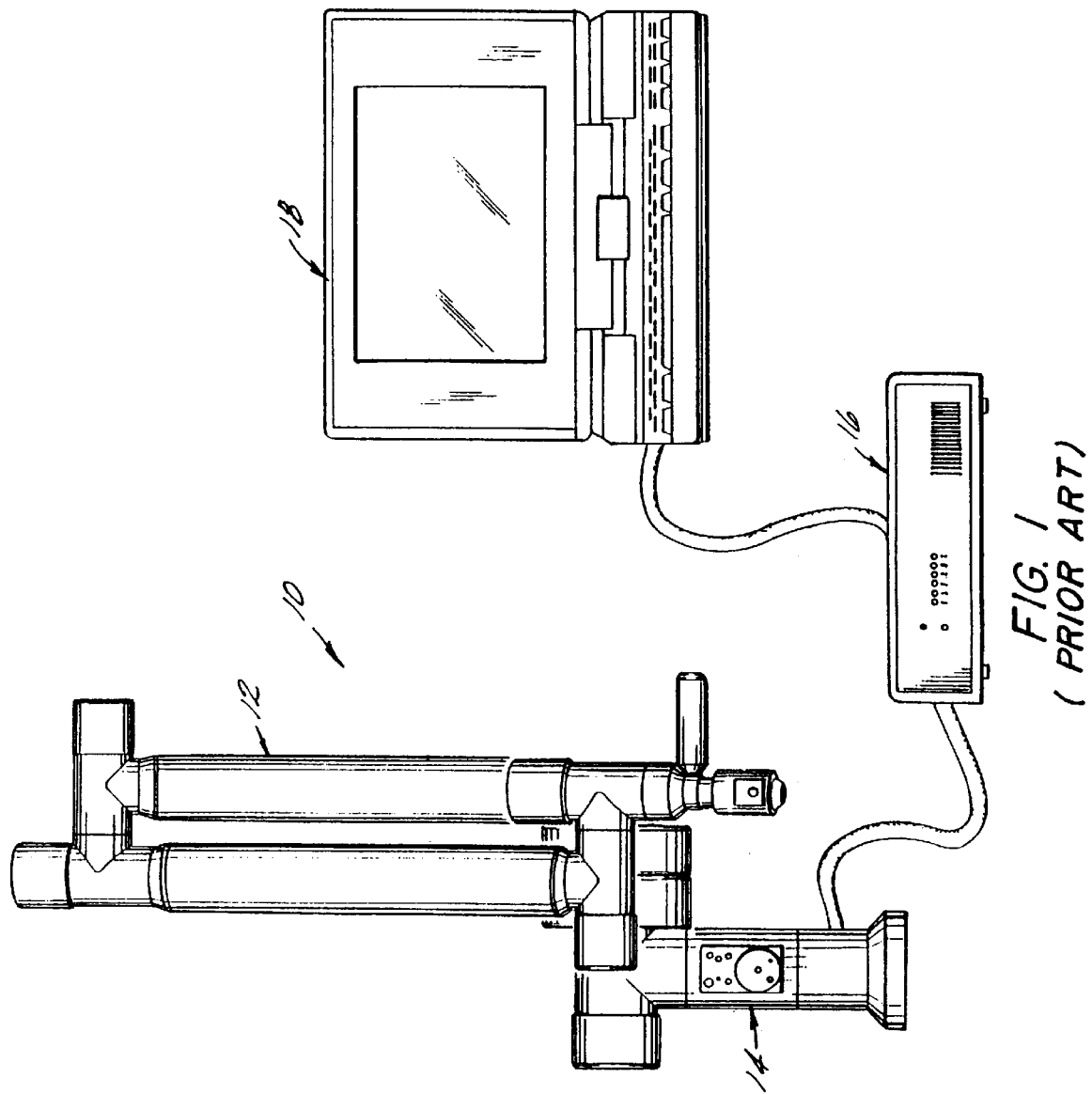
FIG. 1 is a diagrammatic view of a conventional CMM system.
Figure 2:
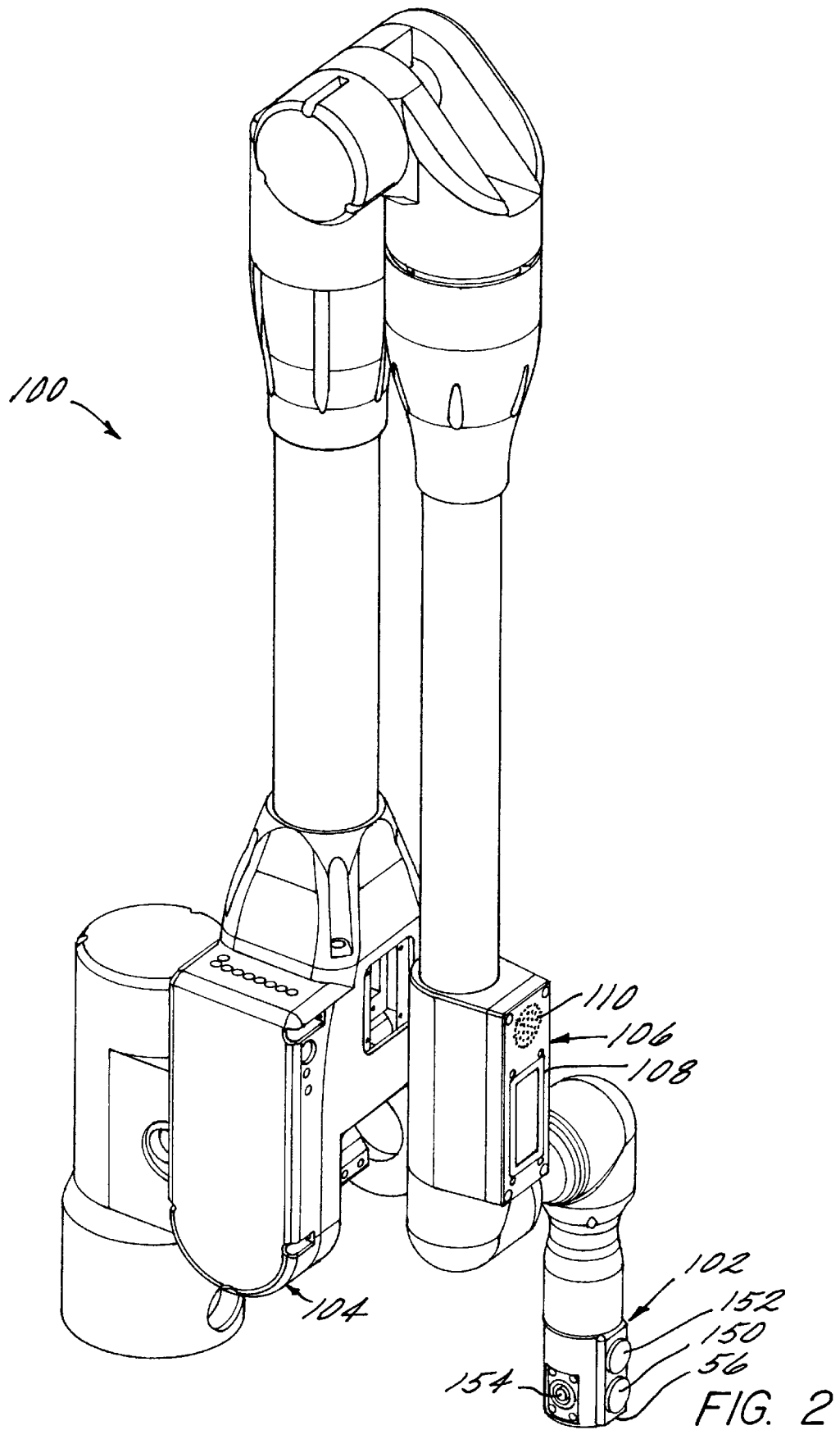
FIG. 2 is a perspective view of an articulated arm in accordance with the present invention.

FIG. 2 is a perspective view of an articulated arm, shown generally at 100, in accordance with the present invention. Articulated arm 100 includes a plurality of rotational transfer housings similar to those described in U.S. Pat. No. 5,402,582. Each transfer housing provides a degree of freedom to the articulated arm 100 to allow articulated arm 100 to measure points in three dimensional space. Arm 100 includes a probe end 102 having a probe/switch module 56 such as that described in U.S. Pat. No. 5,402,582. Probe/switch assembly 56 mounts a variety of probes and includes switches 150 and 152. A connector 154 is included in probe/switch assembly 56 for attachment of optional electronics.

Articulated arm 100 includes an on-board controller 104 mounted directly on the articulated arm 100. The controller 104 may be permanently or detachably mounted to the arm 100. The controller 104 can be detachably mounted to the arm using a variety of known techniques. Controller 104 may include a magnet base which mounts to a ferrous surface on the arm 100 or any other object. In another embodiment, controller 104 and arm 100 have complimentary hook and loop type fabric. In yet another embodiment, a spring clip type fastener as is known is used for detachably mounting the controller 104 to the arm 100.

Controller 104 stores one or more executable programs and the reference (e.g. CAD) data. The reference data may be an entire CAD file corresponding to an entire object to be measured or just portions of the CAD data. As will be described in detail below, the controller includes a processor that executes the executable programs and provides prompts to the user through user interface 106 including a display 108 and a speaker 110. The display 108 may be an LCD screen or may be less complex such as a series of LEDs. The speaker 110 can provide the user with audible indications of events such as a transfer housing being rotated beyond a predetermined limit. User interface 106 may be detachable from arm 100 and arm 100 may including a plug for connecting the detached user interface 106 to the arm 100. The mounting devices described above with respect to controller 104 may be used to detachably mount the user interface 106 to the arm 100. Additional details of the user interface are found in U.S. patent application entitled "Display Device for a Coordinate Measurement Machine" filed Jul. 1, 1998, the contents of which are incorporated herein by reference. In FIG. 2, the controller 104 and the user interface 106 are shown as separate units. The controller 104 and the user interface 106 may be combined in a single unit that is either permanently or detachably mounted to the arm 100.

Figure 3:
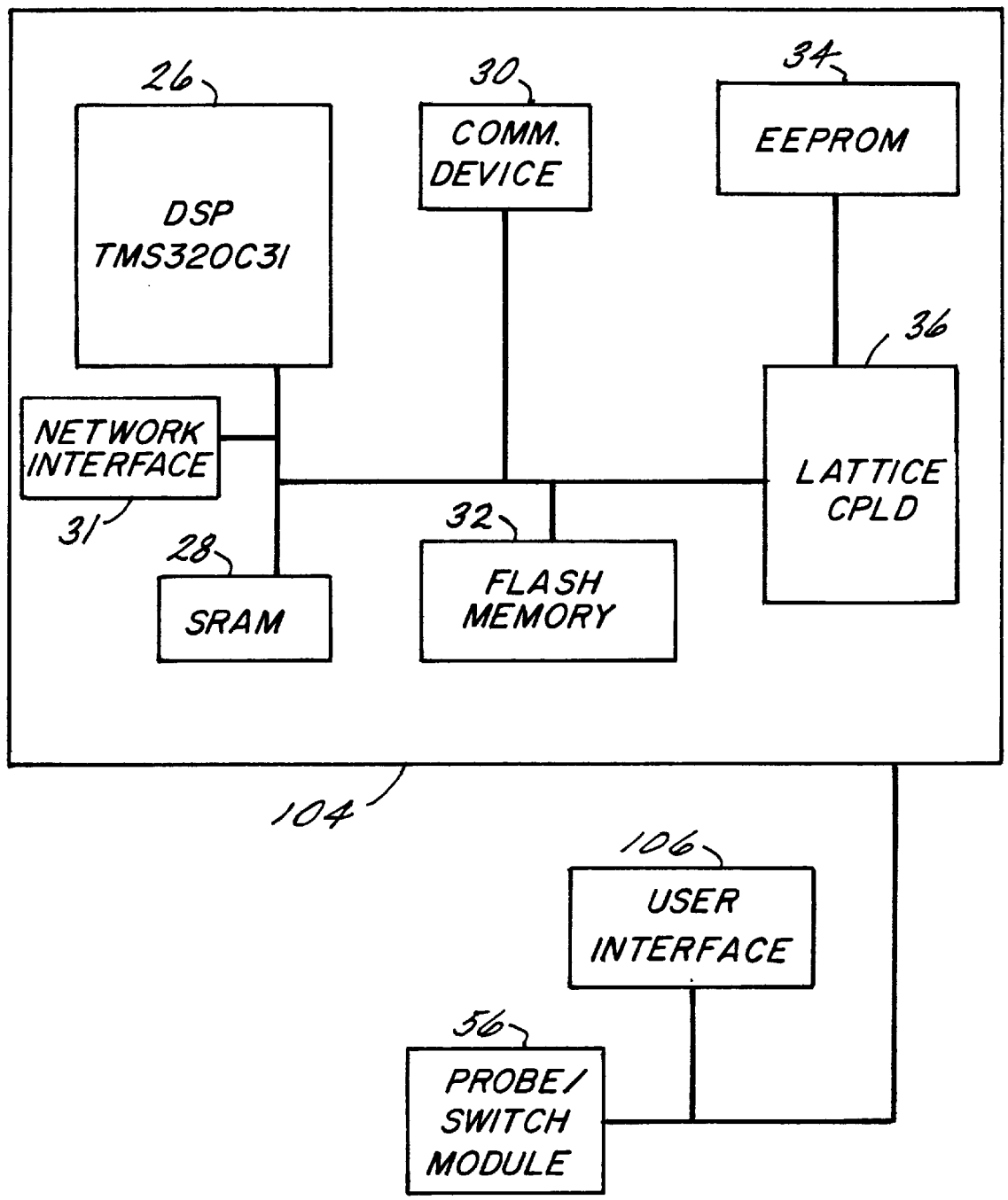
FIG. 3 is a schematic block diagram of a portion of the articulated arm.

FIG. 3 is a block diagram illustrating the controller 104, the probe/switch assembly 56 and the user interface 106. The controller 104 includes a microprocessor 26 and random access memory 28 for storing instructions to be executed by microprocessor 26. One or more executable programs may be stored in memory 28. An exemplary executable program is an inspection protocol that directs the user through an inspection procedure. It is understood that other types of executable programs (calibration, diagnostic, etc.) may be stored in memory 28. The user can select a particular executable program from a menu presented on the display 108.

A communication device 30 (for example a universal asynchronous receiver/transmitter) enables communication from the controller 104 to outside devices such as a host computer. This allows the executable programs to be uploaded into the controller 104 through communication device 30. In addition, the actual measurement data and the results of the comparisons of the actual data to reference data can be download to the host and stored. Flash memory 32 stores program instructions and arm parameters permanently. A lattice complex programmable logic device (CPLD) 36 and associated electrically erasable programmable read only memory (EEPROM) 34 are also included in the controller 24. The CPLD 36 contains interconnection logic between the components of controller 24. The particular memory devices shown in FIG. 3 are exemplary and it is understood that a variety of memory configurations may be used.

As shown in FIG. 3, the controller may also include a network interface 31 (e.g. an Ethernet card) for allowing the controller 104 to communicate over a network such as a local area network. The network serves as a communication path and does not perform functions associated with the conventional host computer described above. A conventional host computer would control the measurement process whereas the network simply provides a communications path for operations such as uploading executable programs into the controller 104 or downloading the actual measurement data and the results of the comparisons of the actual data to reference data.

Operation of the articulated arm 100 will now be described. Initially, executable programs created on the host computer and the reference data are stored in the controller 104 through communication device 30. The user selects a particular executable program such as an inspection procedure. The display 108 then prompts the user to measure predetermined points on the object. The processor 26 compares the actual data to the reference data as the actual data is acquired or after a complete set of actual data has been collected. After the actual data and the reference data are compared, the user can then be notified of any points on the object that do not match the reference data. Additional measurements may be performed and/or the object may be designated as out of specification.

Storing the executable programs and the reference data on the articulated arm and providing the arm with a controller capable of implementing the programs significantly reduces the cost to the user. In the conventional system, each articulated arm is accompanied by a host computer. In the present invention, a user may purchase one host computer to perform complex tasks such as generating applications programs which can then be uploaded to multiple articulated arms. This eliminates the need for multiple host computers and thus reduces costs.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A system for measuring coordinates of an object comprising:
   an articulated arm including a plurality of rotational transfer housings, each transfer housing providing a degree of freedom, said articulated arm measuring points in three dimensional space;
   a controller mounted to the articulated arm including memory for storing an executable program and reference data; and
   a user interface mounted to the articulated arm for providing information to an operator.

2. The system of claim 1 wherein said executable program is an inspection procedure for directing the operator through a measurement procedure.

3. The system of claim 1 wherein said reference data is CAD data representing the entire object.

4. The system of claim 1 wherein said reference data is CAD data representing a portion of the object.

5. The system of claim 1 wherein said user interface includes a display.

6. The system of claim 5 wherein said display is a liquid crystal display.

7. The system of claim 5 wherein said display includes a light emitting diode.

8. The system of claim 1 wherein said user interface includes a speaker.

9. The system of claim 5 wherein said user interface includes a speaker.

10. The system of claim 1 wherein said user interface is detachably mounted to the arm.

11. The system of claim 1 wherein said controller includes a network interface.

12. The system of claim 1 wherein said controller is detachably mounted to said arm.

13. The system of claim 1 wherein said controller is separate from said user interface.

14. A method of operating an articulated arm for measuring the coordinates of an object comprising:
   providing an articulated arm including a plurality of rotational transfer housings, each transfer housing providing a degree of freedom, said articulated arm measuring points in three dimensional space;
   storing an executable program in a controller mounted to the articulated arm;
   storing reference data in the controller; and
   executing the executable program to provide instructions to an operator for taking actual measurements of the object.

15. The method of operating an articulated arm of claim 14 further comprising:
   comparing the actual measurements to the reference data.

16. The method of operating an articulated arm of claim 14 wherein said reference data is CAD data representing the entire object.

17. The method of operating an articulated arm of claim 14 wherein said reference data is CAD data representing a portion of the object.

18. The method of operating an articulated arm of claim 14 further comprising notifying the operator of a difference between the actual measurement and the reference data.

19. The method of operating an articulated arm of claim 14 wherein:

said storing the executable program includes storing a plurality of executable programs in the controller.

20. The system of claim 1 wherein:

said articulated arm includes a base.

21. The system of claim 1 wherein:

said controller is mounted directly to said articulated arm.

22. The system of claim 1 wherein:

said user interface is mounted directly to said articulated arm.

23. The system of claim 1 wherein:

said controller is mounted adjacent to one of said rotational transfer housings.

24. The system of claim 1 wherein:

said controller is mounted to one of said rotational transfer housings.

* * * * *